United States Patent
Coste et al.

(10) Patent No.: US 12,475,713 B2
(45) Date of Patent: Nov. 18, 2025

(54) METHOD OF REFLECTION REMOVAL BASED ON A GENERATIVE ADVERSARIAL NETWORK USED FOR TRAINING OF AN ADAS CAMERA OF A VEHICLE

(71) Applicant: Continental Autonomous Mobility Germany GmbH, Ingolstadt (DE)

(72) Inventors: Darius-Petrisor Coste, Ineu (RO); Cristian Bacican, Timisoara (RO)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 280 days.

(21) Appl. No.: 18/051,747

(22) Filed: Nov. 1, 2022

(65) Prior Publication Data

US 2023/0135636 A1    May 4, 2023

(30) Foreign Application Priority Data

Nov. 1, 2021  (EP) .................................... 21465557
Nov. 2, 2021  (GB) .................................... 2115714

(51) Int. Cl.
 *G06V 20/58*        (2022.01)
 *B60W 40/12*        (2012.01)

(52) U.S. Cl.
 CPC ............. *G06V 20/58* (2022.01); *B60W 40/12* (2013.01); *B60W 2420/403* (2013.01)

(58) Field of Classification Search
 CPC .... G06N 3/045; G06N 3/0464; G06N 3/0475; G06N 3/048; G06N 3/094; B60W 2420/403; B60W 40/12; G06V 20/58; Y02T 10/40; G06T 11/00;
 (Continued)

(56) References Cited

U.S. PATENT DOCUMENTS

| | | | |
|---|---|---|---|
| 11,688,041 B2 * | 6/2023 | Jegannathan ............. | G06T 5/94 382/274 |
| 2016/0010998 A1 * | 1/2016 | Chia ....................... | G01S 19/13 701/461 |
| 2017/0285161 A1 * | 10/2017 | Izzat ..................... | G01S 17/931 |

(Continued)

OTHER PUBLICATIONS

Lin Gao et al., "RASWNet: An Algorithm That Can Remove All Severe Weather Features from a Degraded Image," May 6, 2020, IEEE Access, vol. 8, pp. 76002-76015.*

(Continued)

*Primary Examiner* — Omar S Ismail

(57) ABSTRACT

A method of reflection removal based on a GAN used for training of an ADAS vehicle camera includes acquisition, training and inference operations. In a first training operation, data processing hardware acquires two randomly sampled pairs of images from a first image dataset and carries out two simultaneous altering and overlapping of the image pair generating first and second mixed images. In a second training operation, the first image together with a third mixed image are altered, the third mixed image proceeding from a second dataset. The output of the first and second training operations enter the third training operation which is carried out by using the GAN. A third training operation generates first, second and third predicted transmission images; and a machine learning model is optimized for the predicted transmission images as close as possible, compressed and sent to a GAN machine learning block.

10 Claims, 8 Drawing Sheets

(58) Field of Classification Search
CPC . G06T 2207/20081; G06T 2207/20084; G06T 2207/30252; G06T 5/60; G06T 5/77
See application file for complete search history.

(56) References Cited

U.S. PATENT DOCUMENTS

| | | | |
|---|---|---|---|
| 2018/0216958 A1* | 8/2018 | Park | G06Q 30/0241 |
| 2018/0217254 A1* | 8/2018 | Hong | H01Q 21/24 |
| 2019/0258251 A1* | 8/2019 | Ditty | G05D 1/0274 |
| 2020/0364892 A1* | 11/2020 | Ko | G05D 1/12 |
| 2021/0199446 A1* | 7/2021 | Marschner | G01C 21/3676 |
| 2021/0201050 A1* | 7/2021 | Marschner | G06F 18/217 |
| 2021/0201569 A1* | 7/2021 | Marschner | G01S 17/89 |
| 2021/0287365 A1* | 9/2021 | Lu | G06V 10/764 |
| 2022/0026920 A1* | 1/2022 | Ebrahimi Afrouzi | G06N 7/01 |

OTHER PUBLICATIONS

Isaac Ogunrinde et al., "A Review of the Impacts of Defogging on Deep Learning-Based Object Detectors in Self-Driving Cars," Apr. 21, 2021, SoutheastCon 2021, pp. 1-6.*

Kaixuan Wei et al., Single Image Reflection Removal Exploiting Misaligned Training Data and Network Enhancements, Jun. 2019, Proceedings of the IEEE/CVF Conference on Computer Vision and Pattern Recognition (CVPR), 2019, pp. 8178-8184.*

Huaidong Zhang et al.;"Fast User-Guided Single Image Reflection Removal via Edge-Aware Cascaded Networks," Jul. 24, 2020, IEEE Transactions on Multimedia, vol. 22, No. 8, Aug. 2020, pp. 2012-2020.*

Donghoon Lee et al., "Generative Single Image Reflection Separation," Jan. 12, 2018,arXiv preprint arXiv:1801.04102, 2018, pp. 1-8.*

Yazan Hamzeh et al., "A Review of Detection and Removal of Raindrops in Automotive Vision Systems," Mar. 10, 2021,Journal of Imaging 2021, 7, 52,pp. 1-17.*

Daiqian Ma et al., "Learning to Jointly Generate and Separate Reflections," Oct. 2019, Proceedings of the IEEE/CVF International Conference on Computer Vision (ICCV), 2019, pp. 2444-2450.*

Jörn Thieling et al., "Neural Networks for End-to-End Refinement of Simulated Sensor Data for Automotive Applications," Sep. 16, 2019,2019 IEEE International Systems Conference (SysCon), pp. 1-8.*

Wenjie Luo et al.,"Weakly Supervised Learning for Raindrop Removal on a Single Image,"May 5, 2021, IEEE Transactions on Circuits and Systems for Video Technology, vol. 31, No. 5, May 2021,pp. 1673-1680.*

You Li et al., "Exploiting Reflection Change for Automatic Reflection Removal", 2013 IEEE International Conference on Computer Vision, Dec. 1-8, 2013, https://ieeexplore.ieee.org/document/6751413, available online as of Mar. 3, 2014.

Qiang Wen et al., "Single Image Reflection Removal Beyond Linearity", Proceedings of the IEEE/CVF Conference on Computer Vision and Pattern Recognition (CVPR), Jun. 15-20, 2019, https://openaccess.thecvf.com/content_CVPR_2019/html/Wen_Single_Image_Reflection_Removal_Beyond_Linearity_CVPR_2019_paper.html, available online as of Jan. 9, 2020.

Yi Chang Shih et al., "Reflection removal using ghosting cues", 2015 IEEE Conference on Computer Vision and Pattern Recognition (CVPR), Jun. 7-12, 2015, https://ieeexplore.ieee.org/document/7298939, available online as of Oct. 15, 2015.

Tianfan Xue et al., "A Computational Approach for Obstruction-Free Photography", ACM Transactions on Graphics (Proc. SIGGRAPH), 2015, https://people.csail.mit.edu/mrub/papers/ObstructionFreePhotography_SIGGRAPH2015.pdf.

Renjie Wan et al., "Depth of field guided reflection removal", 2016 IEEE International Conference on Image Processing (ICIP), Sep. 25-28, 2016, https://ieeexplore.ieee.org/document/7532311.

Nikolaos Arvanitopouls et al., "Single Image Reflection Suppression", 2017 IEEE Conference on Computer Vision and Pattern Recognition (CVPR), Jul. 21-26, 2017, https://ieeexplore.ieee.org/document/8099673, available online as of Nov. 9, 2017.

Donghoon Lee et al., "Generative Single Image Reflection Separation", arXiv: 1801.04102v1 [cs.CV], Jan. 12, 2018, https://arxiv.org/pdf/1801.04102.pdf.

Huaidong Zang et al., "Fast User-Guided Single Image Reflection Removal via Edge-Aware Cascaded Networks", IEEE Transactions on Multimedia (vol. 22, Issue: 8, Aug. 2020), pp. 2012-2023, Nov. 4, 2019, https://ieeexplore.ieee.org/document/8890835.

Yu Li et al., "Single Image Layer Separation using Relative Smoothness", 2014 IEEE Conference on Computer Vision and Pattern Recognition, Jun. 23-28, 2014, https://openaccess.thecvf.com/content_cvpr_2014/papers/Li_Single_Image_Layer_2014_CVPR_paper.pdf, available online as of Sep. 25, 2014.

Daiqian Ma et al., "Learning to Jointly Generate and Separate Reflections", 2019 IEEE/CVF International Conference on Computer Vision (ICCV), Oct. 27-Nov. 2, 2019, https://openaccess.thecvf.com/content_ICCV_2019/papers/Ma_Learning_to_Jointly_Generate_and_Separate_Reflections_ICCV_2019_paper.pdf, available online as of Feb. 27, 2020.

Meiguang Jin et al., "Learning to see through reflections", 2018 IEEE International Conference on Computational Photography (ICCP), May 4-6, 2018, https://ieeexplore.ieee.org/document/8368464, available online as of May 31, 2018.

Ryo Abiko et al., "Single Image Reflection Removal Based on GAN With Gradient Constraint", IEEE Access (vol. 7), pp. 148790-148799, Oct. 14, 2019, https://ieeexplore.ieee.org/document/8868089.

Chao Li et al., "Single Image Reflection Removal through Cascaded Refinement", arXiv:1911.06634v2 [cs.CV], Apr. 5, 2020 https://arxiv.org/abs/1911.06634.

Kaizuan Wei et al., "Single Image Reflection Removal Exploiting Misaligned Training Data and Network Enhancements", arXiv: 1904.00637v1 [cs.CV], Apr. 1, 2019, https://arxiv.org/pdf/1904.00637.pdf.

Kuaner Zhang et al., "Single Image Reflection Separation with Perceptual Losses", arXiv:1806.05376v1 [cs.CV], Jun. 14, 2018, https://arxiv.org/abs/1806.05376.

Qingnan Fan et al., "A Generic Deep Architecture for Single Image Reflection Removal and Image Smoothing", arXiv: 1708.03474v2 [cs.CV] Jun. 10, 2018, https://arxiv.org/abs/1708.03474.

Jie Yang et al., "Seeing Deeply and Bidirectionally: A Deep Learning Approach for Single Image Reflection Removal", Proceedings of the European Conference on Computer Vision (ECCV), 2018, pp. 654-669, https://link.springer.com/conference/eccv.

Olga Russakovsky et al., "ImageNet Large Scale Visual Recognition Challenge", arXiv:1409.0575v3, Jan. 30, 2015, https://arxiv.org/pdf/1409.0575.pdf.

Combined Search and Examination Report, Intellectual Property Office, for counterpart GB patent application GB2115714.4, Jul. 15, 2022.

Extended European Search Report dated Mar. 28, 2023 for the counterpart European Patent Application No. 22201878.0.

* cited by examiner

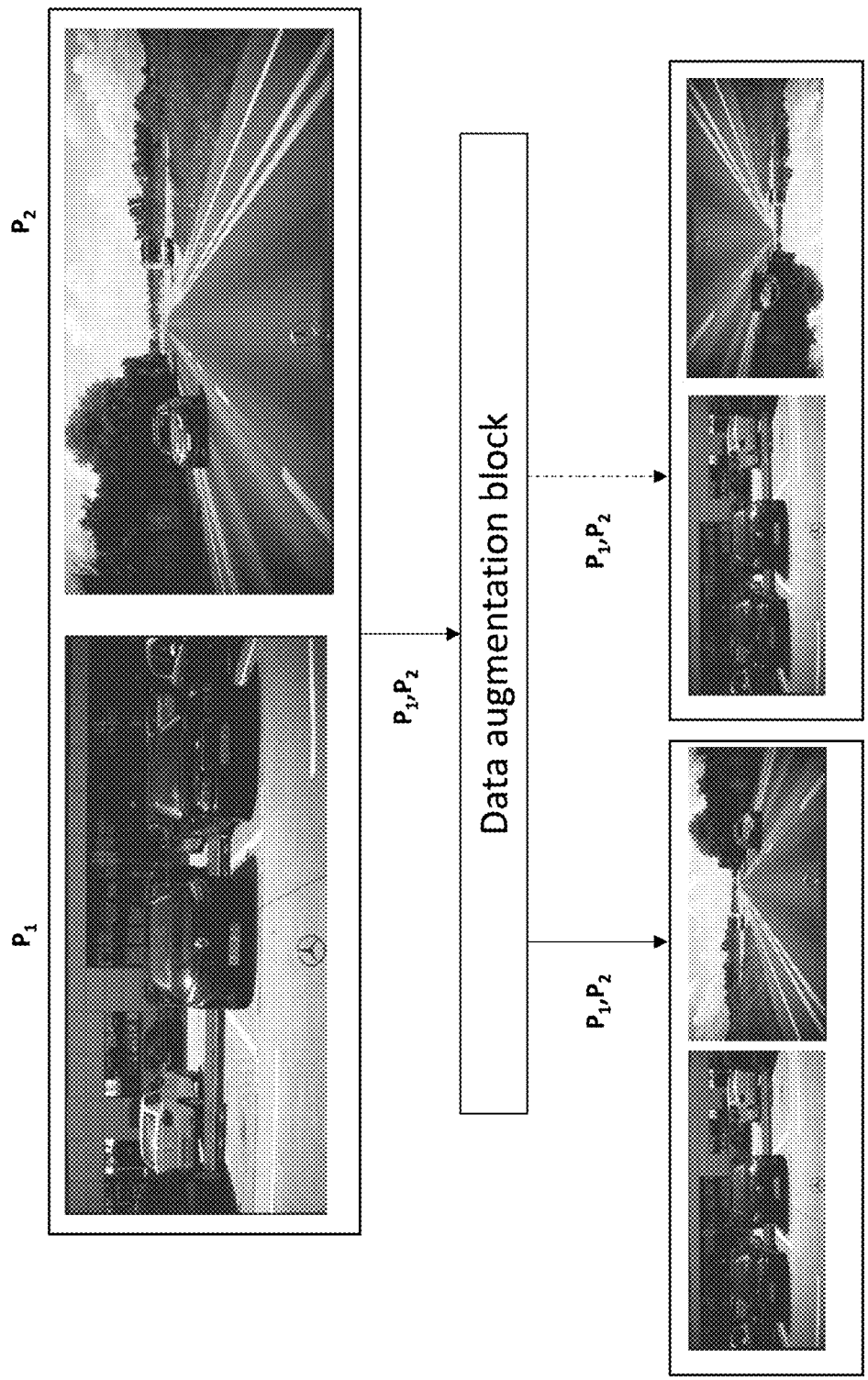
Fig. 3.1

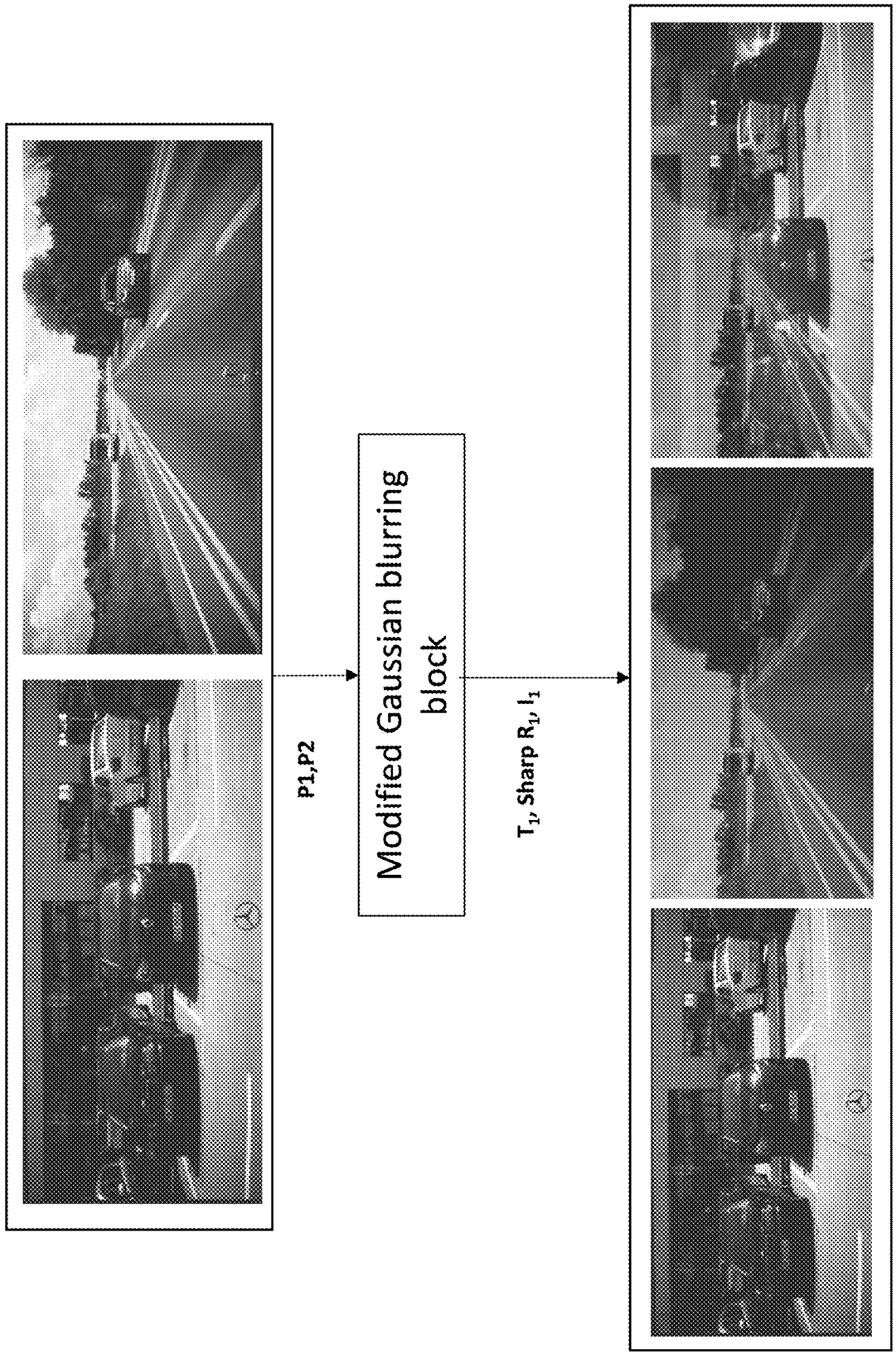
Fig. 3.2

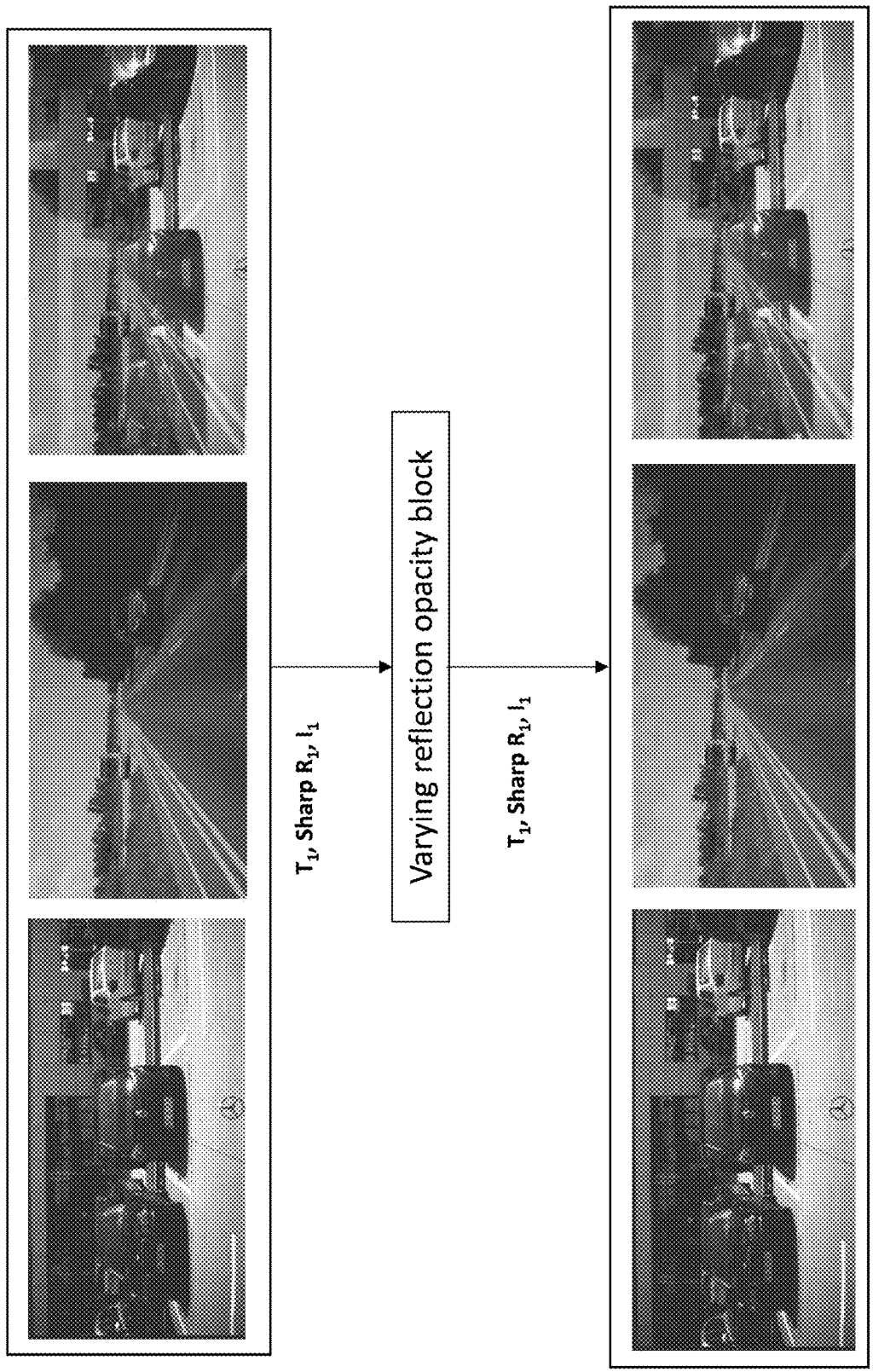
Fig. 3.3

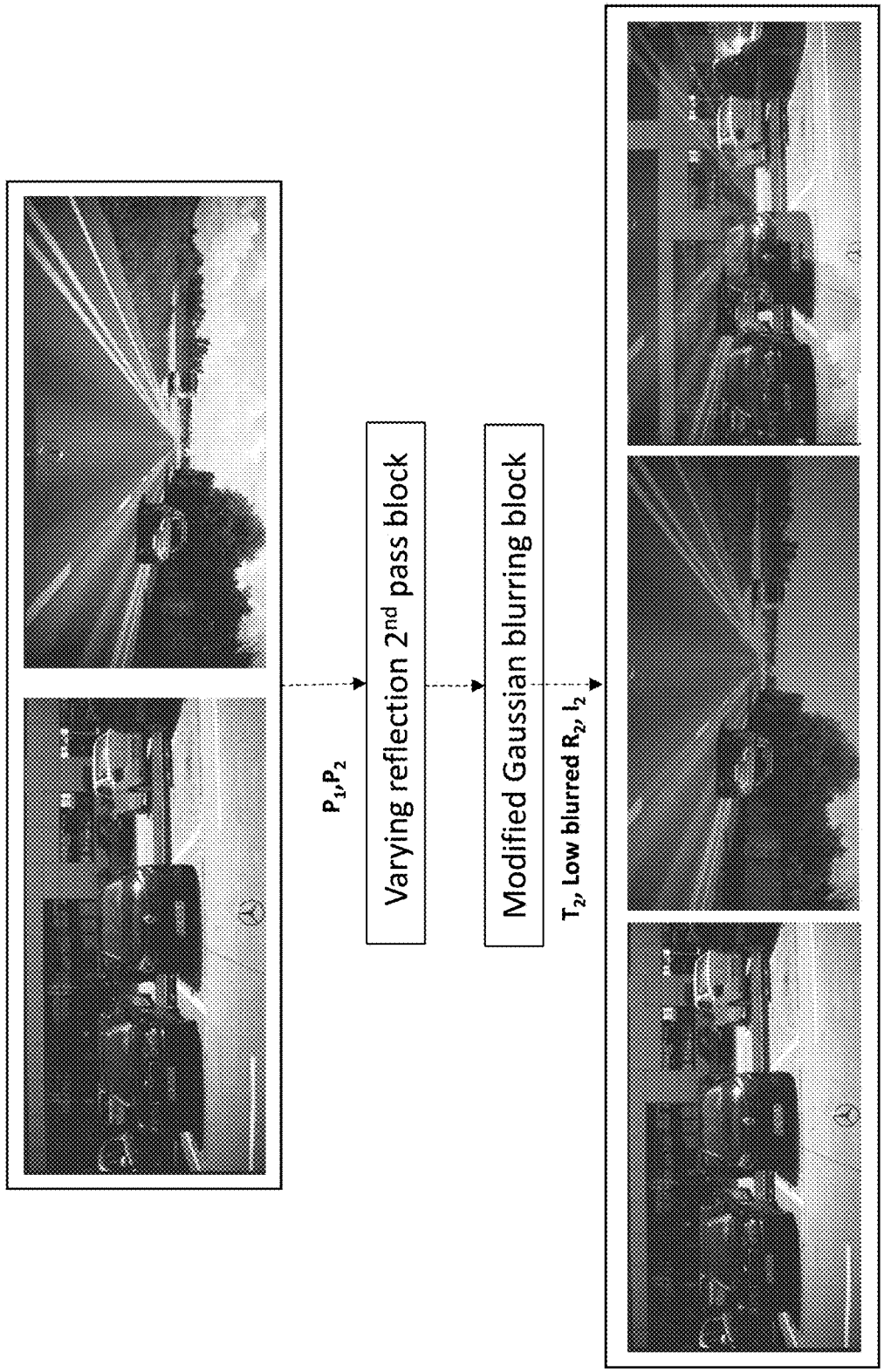
Fig. 3.4

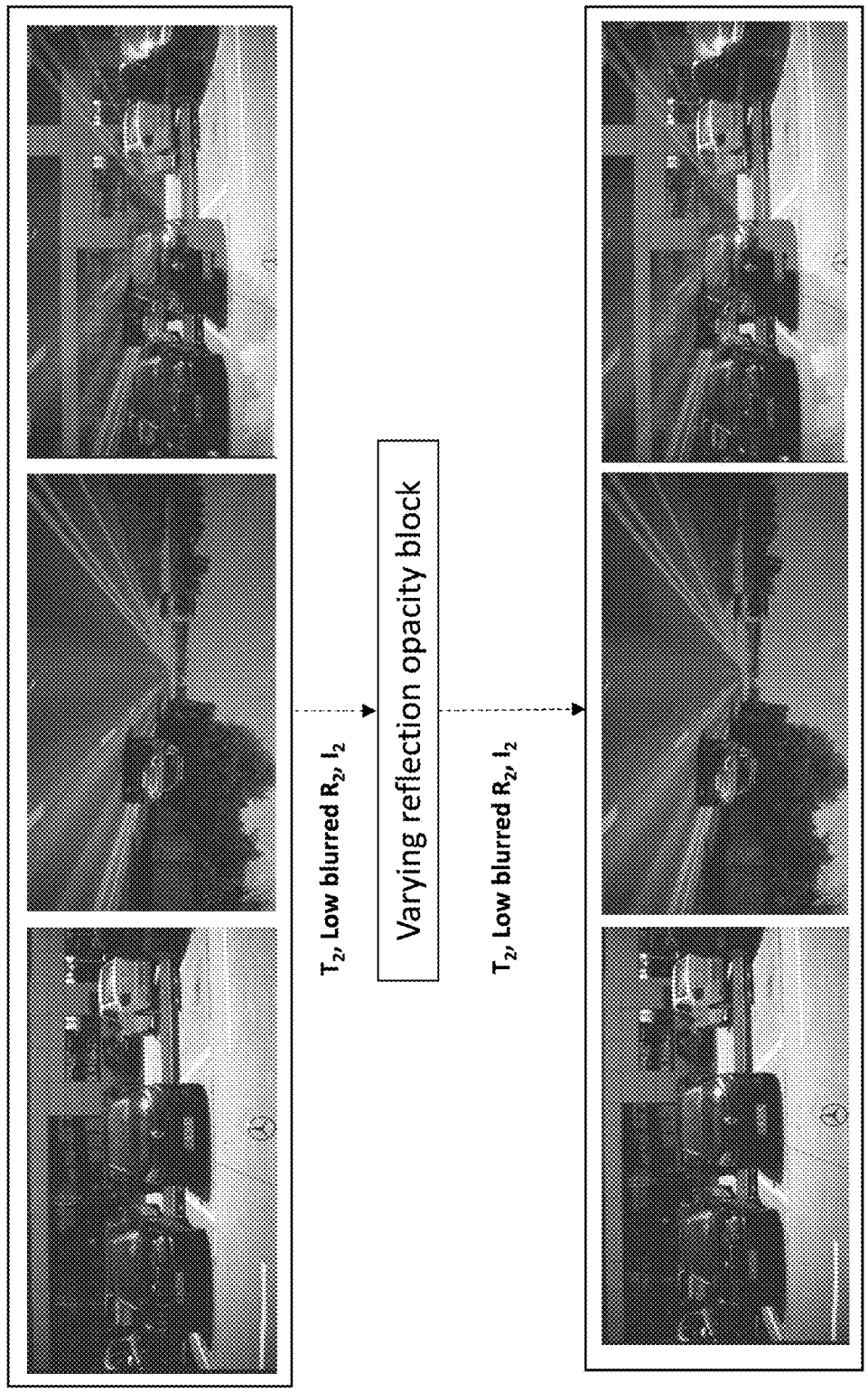
Fig. 3.5

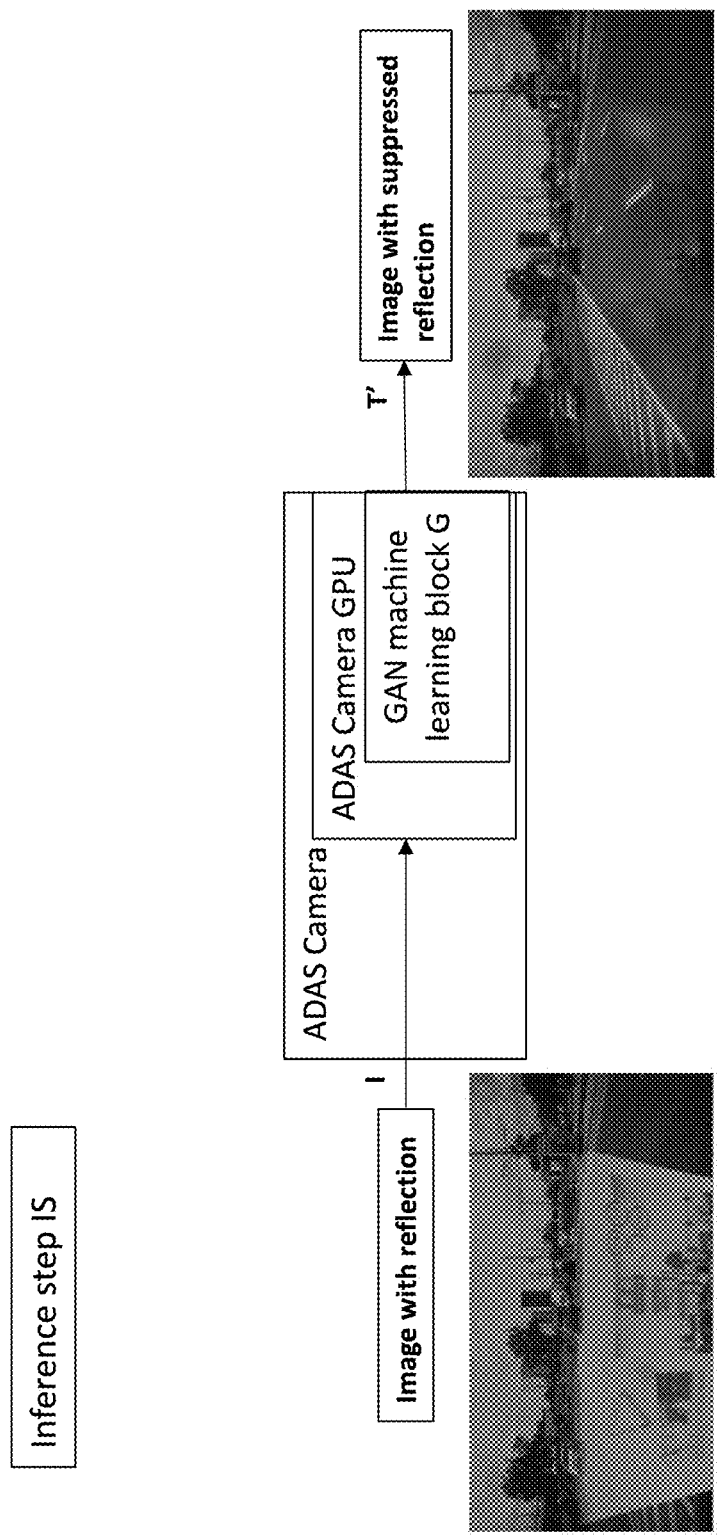

METHOD OF REFLECTION REMOVAL BASED ON A GENERATIVE ADVERSARIAL NETWORK USED FOR TRAINING OF AN ADAS CAMERA OF A VEHICLE

CROSS-REFERENCE TO RELATED APPLICATIONS

The present application claims priority to European Patent Application No. 21465557.3 filed on Nov. 1, 2021, in the European Patent Office, and Great Britain Patent Application No. 2115714.4 filed on Nov. 2, 2021, in the United Kingdom Intellectual Property Office. The content of both applications are incorporated by reference herein in their entirety.

TECHNICAL FIELD

The present invention relates to removing window reflection from the images acquired by cameras mounted in the interior of a vehicle, the images used in advanced driver assistance systems (ADAS). In particular the present invention relates to a method of reflection removal based on Generative Adversarial Networks (GANs) used for training of the ADAS camera of the vehicle.

BACKGROUND

Throughout this invention the following terms have the following corresponding meanings.

"Advanced driver assistance systems cameras," hereafter alternatively called ADAS cameras, or, alternatively cameras, are used in the automotive industry for the purpose to provide quick and accurate detection and recognition of objects and persons from the exterior of the vehicle such as other vehicles, pedestrians, obstacles, traffic signs, lane markers, etc. The information captured by cameras is then analyzed by an ADAS processing chain and used to trigger a response by the vehicle.

The ADAS camera shall be understood as including the hardware and the software needed to carry out the respective steps of the method, according to the present disclosure.

A "vehicle" is, in this present disclosure, any road vehicle provided with at least one ADAS camera acquiring pictures through at least one window of the vehicle.

A "reflection," alternatively called a "window reflection," is used throughout this present disclosure with the meaning of a light in the ADAS camera, which was not intended when the ADAS camera as optical system was designed.

Other terms that shall be used interchangeably in this present disclosure are: picture(s), image(s), frame(s), having the same meaning of picture(s) acquired by the ADAS camera. The picture(s) acquired by the ADAS camera include the video frames, as the difference between picture and video is only a matter of frame rate.

The problem of reflection removal using only one image is addressed in the literature identified in the List of Bibliographical References below. There are more than a few methods that solve the problem under different constraints, or only in a subset of situations.

The mechanical ways to remove the reflection generally include placing some kind of plastic around the camera in order to mechanically remove the reflection.

The first successful methods require additional contextual information or make assumptions that do not hold for all reflections or environmental situations. Such are the methods disclosed in documents [1], [4] that require capturing the same scene from different viewpoints, [1] assumes the reflection will change, and as such considers it dynamic between the frames, and what is static is considered as background with useful information.

The method disclosed in document [2] assumes that the reflection layer is blurred, while in document [3] the proposed method considers that the reflection layer has a ghosting effect, and what that means is that there is a second shifted and attenuated reflection of the objects on the same side of the glass as the camera.

Document [5] makes use of the depth of field of the image in order to determine the reflection layer which is considered closer.

Document [6]proposes to not remove the reflection layer but to suppress it by making use of a Laplacian data fidelity term and gradient sparsity. In document [6] the suppression of the reflection, without its removal, can still affect the interpretability of the occluded scene behind the reflection.

More recent breakthroughs were achieved by making use of Deep Learning, such are the cases presented in the documents [7], [8], [9], [10], [11], [12], [13], [14], [15] and [16] which make use of convolutional neural networks in order to learn a mapping between the initial image, henceforward referred as I, which has a reflection overlapping the information layer, and the transmission image T, which is the expected image with information and without reflection.

In some cases, the reflection is generated synthetically as to obtain a pixel level alignment between I and T. Then, for each pixel, the difference made by the reflection layer, which consists of the reflection image and is referred as R when obtruding the information layer, can be calculated.

In other cases, the I and T images are not aligned at a pixel level, but they represent the same environment, either taken at two different moments in time, in one moment when there is a glass in front of the camera as to have the reflection present, and in another moment when there is no reflection present.

In other cases, there are two cameras present arranged side by side, one having a reflective layer in front of it, while the other does not, as to capture the same scene at the same moment. In both cases there will not be a pixel alignment between the image pairs and the solution is to compare the images at the feature level.

Convolution Neural Networks (CNNs) can be used for automating the feature learning such that to allow the calculation of the difference between the two layers at the feature level when it is not relevant to compare at the pixel level.

Some of the solutions, such as the documents [7], [9], [10], [11], [12], [13], [14], [15], and [17] include the use of the GANs because of the advantage these networks have as they include a Discriminator component, which takes the resulting image from a Generator, that is usually based on CNNs, and tries to determine how realistic the predicted image with the removed reflection is compared to the reference image with no reflection.

There are two major categories of difficulties when making use of CNNs for image reflection removal.

Firstly, a loss function that encapsulates the perceptual difference between the image pairs R and T is hard to define as it is hard to mathematically encapsulate the realistic perception of an image. The fact that in some cases the pairs R and T, that represent the same scene, are unaligned makes it an even harder task.

Secondly, having a good network architecture that can distinguish and remove the reflection layer requires training on a wide variety of images with reflection layers that are dynamic, vary in intensity, blurring, transparency and other factors. Having a dataset of diverse reflections implies either having a lot of paired images with and without reflection that are diverse, which are hard to collect, or to have a method of generating realistic and diverse reflections.

Document [14] refers to a method of single image reflection removal by exploiting targeted network enhancements and by the novel use of misaligned data. When it comes to the targeted network enhancements, document [14] discloses augmenting a baseline network architecture by embedding context encoding modules that are capable of leveraging high-level contextual clues to reduce indeterminacy within areas containing strong reflections. When it comes to the novel use of misaligned data, document [14] introduces an alignment-invariant loss function that facilitates exploiting misaligned real-world training data that is much easier to collect.

The experiments are carried out using GANs, the relevant being here the Single Image Reflection Removal Exploiting Misaligned Training Data and Network Enhancements or ERRNet of document [14]. This architecture is designed so as to work towards the goal of reflection removal. It does this by learning from unaligned pairs of images with and without reflection. At the same time, it uses random images without reflection from which it synthesizes reflection and learns how to remove the generated reflection.

The generation of the synthetical reflections using a type of GANs is disclosed in article [15].

The mechanical methods for reflection removal have the disadvantage that they impair the camera field of view. None of the non-mechanical methods of prior art specifically addresses the reflection removal for the images acquired by the ADAS cameras of the vehicle. They address reflection removal in general.

The methods of the prior art do not work properly in the case of the images acquired by the ADAS cameras of the vehicle for one or more from the following reasons.

ADAS cameras are placed in the interior of the vehicle in specific fixed places, being many times subject to restrictions, such as for example the inclination of the windshield which favors more types of reflection: from the outside of the vehicle and from the interior of the vehicle (dashboard).

In case of ADAS cameras, many of the methods of prior art require additional contextual information which is hard if not impossible to obtain at runtime when the vehicle is in motion.

Some of the methods of the prior art consider the reflection to be blurred. Experience of the person skilled in the art shows that there is almost no blurring present in case of ADAS cameras, which means that making use of the methods of articles [15] and [16] for generating synthetical reflection does not yield satisfactory results, because the two afore-mentioned methods generate reflections that are too blurred on one hand and the real reflections are in many cases too hard to distinguish without contextual information on the other hand.

Other methods of the prior art start from the hypothesis that the reflection layer has a ghosting effect, which in general does not apply to the reflection through the windows of the vehicles, thus this hypothesis is of no use for the removal of the reflection on the images captured by the ADAS cameras.

ADAS cameras provide in general images of lower quality with respect to other categories of cameras, such as the cameras of the mobile phones. Lower quality in this context means that the negative influence of the noise when capturing the images on ADAS cameras is more significant than the negative influence on said other categories of cameras. Given that the images captured by the ADAS cameras are further processed by an ADAS processing chain, if the input image is damaged by the noise, the output—namely the processed image is most likely to be damaged as well.

SUMMARY

The technical problem to be addressed is to find a method for reflection removal using a single image, the method adapted for the specific context when the single image is acquired by an ADAS camera of a vehicle without the need of additional contextual information.

In order to overcome the disadvantages of the prior art, in a first aspect of the present disclosure a method of reflection removal is disclosed based on a GAN used for training of an ADAS camera of a vehicle. It includes the following steps: an acquisition step, training steps and an inference step.

The acquisition step includes capturing simultaneously first ADAS camera images by a first ADAS camera and second ADAS camera images from a second ADAS camera, the first ADAS camera identical with the second ADAS camera and identical with the ADAS camera of the vehicle, and the first ADAS camera further including a physical reflection removal filter. The first ADAS camera and the second ADAS camera are aligned such that to have essentially the same field of view, the first ADAS camera and the second ADAS camera capturing in their respective images essentially the same content at the same time. The captured images are sent to two respective image datasets.

The first ADAS camera images are sent to a first image dataset, including images without reflection, and the second ADAS camera images are sent to a second image dataset, the second image dataset including naturally mixed images having natural reflection. The acquisition step is followed by training steps carried out by a data processing hardware. A first training step includes receiving a randomly sampled pair of images from the first image dataset by a first images acquisition block, carrying out a first altering of the images by a data augmentation and reflection synthesis block, generating a first transmission image, a first synthetical reflection, and a first mixed image. Simultaneously, it is carried out a second altering of the images by the data augmentation and reflection synthesis block, generating a second transmission image, a second synthetical reflection, and a second mixed image. The first transmission image, the first synthetical reflection, the first mixed image, the second transmission image, the second synthetical reflection and the second mixed image are sent to a GAN machine learning block.

A second training step includes receiving, by a second images acquisition block, the first image from the first image dataset and a third mixed image from the second image dataset having the same content with the first image, carrying out by a data augmentation specific to image pairs block augmentation of the first image, generating a third transmission image and augmentation of the third mixed image, using third augmentation parameters, and sending the third transmission image and the third mixed image to the GAN machine learning block. A third training step is carried out by the GAN machine learning block, and includes: generating at each iteration, based on a machine learning model having a plurality of parameters, corresponding predicted transmission images by a Generator of the GAN machine learning block, calculating at each iteration by a Discriminator of the GAN machine learning block a certainty score for respective pair of images of predicted transmission image and transmission image: calculating at each iteration an adversarial loss based on the certainty score, a pixel level loss for the pairs of the respective predicted transmission image and its corresponding transmission image, a feature level loss and an alignment invariant loss for all three pairs of images; optimizing after a preset number of iterations the machine learning model including adjusting the plurality of parameters, such that to optimize the generation of predicted transmission images as close as possible to the respective transmission images, compressing the optimized machine learning model and sending the compressed machine learning model to a GAN machine learning block of the ADAS camera.

The inference step is carried out by the ADAS camera of the vehicle and includes acquiring an image by the ADAS camera, the image containing reflection; suppressing, by the GAN machine learning block of the reflection and generating a predicted transmission image, having the reflection suppressed; and making the predicted transmission image available to an ADAS processing chain.

In a second aspect of the present disclosure, it is presented a data processing hardware configured to carry out the training steps of the method in any of its embodiments. The data processing hardware includes: a first images acquisition block, a second images acquisition block, a data augmentation and reflection synthesis block, a data augmentation block specific to image pairs, and a GAN machine learning block.

In a third aspect of the present disclosure, it is presented an ADAS camera of a vehicle, provided with the machine learning model of the present disclosure, trained in accordance with the training steps of the method in any of its embodiments and configured to carry out the inference step of the method in any of its embodiments.

In a fourth aspect of the present disclosure, it is presented a first computer program including instructions which, when executed by the data processing hardware of the present disclosure, causes the respective data processing hardware to perform the training steps of the method in any of its embodiments.

In a fifth aspect of the present disclosure, it is presented a second computer program comprising instructions which when executed by the ADAS camera of the present disclosure, causes the respective ADAS camera to perform the inference step of the method in any of its embodiments.

In a sixth aspect of the present disclosure, it is presented a first computer readable medium having stored thereon instructions of the first computer program of the present disclosure.

Finally, in a seventh aspect of the present disclosure, it is presented a second computer readable medium having stored thereon instructions of the second computer program of the present disclosure.

Further advantageous embodiments are the subject matter of the dependent claims.

The main advantages of using the present disclosure are as follows.

The method of the present disclosure provides a better removal of the reflection from the images acquired by the ADAS camera of a vehicle as compared with the mechanical methods of prior art because the field of view of the camera is not impaired.

The method works without the need of additional contextual information.

The training method of the present disclosure has the advantage that, when compared with the training method of prior art, generalizes better what is and what is not a reflection in the images acquired by the ADAS camera yielding better results than the training methods of the prior art for the particular case of ADAS cameras used in the vehicles, while at the same time not altering the non-reflection part of images.

The method of the present disclosure yields excellent results in the very frequent context when the reflection is not blurred, which happens in most cases when the reflection is strong, and the window glass is close to the ADAS camera.

BRIEF DESCRIPTION OF THE DRAWINGS

Further special features and advantages of the present invention can be taken from the following description of an advantageous embodiment by way of the accompanying drawings:

FIG. 3.1 illustrates the resulting images outputted by the data augmentation block;

FIG. 3.2 illustrates the three images outputted by the modified Gaussian blurring block corresponding to the first mixed image;

FIG. 3.3 illustrates the three images outputted by the modified Gaussian blurring block after processing by the varying reflection opacity block, corresponding to the first mixed image;

FIG. 3.4 illustrates the three images outputted by the varying reflection pass block corresponding to the second mixed image;

FIG. 3.5 illustrates the three images outputted by the modified Gaussian blurring block after processing by the varying reflection opacity block corresponding to the second mixed image; and FIG. 3.6 illustrates an example of reflection removal in the inference step.

DETAILED DESCRIPTION

Figure 1:
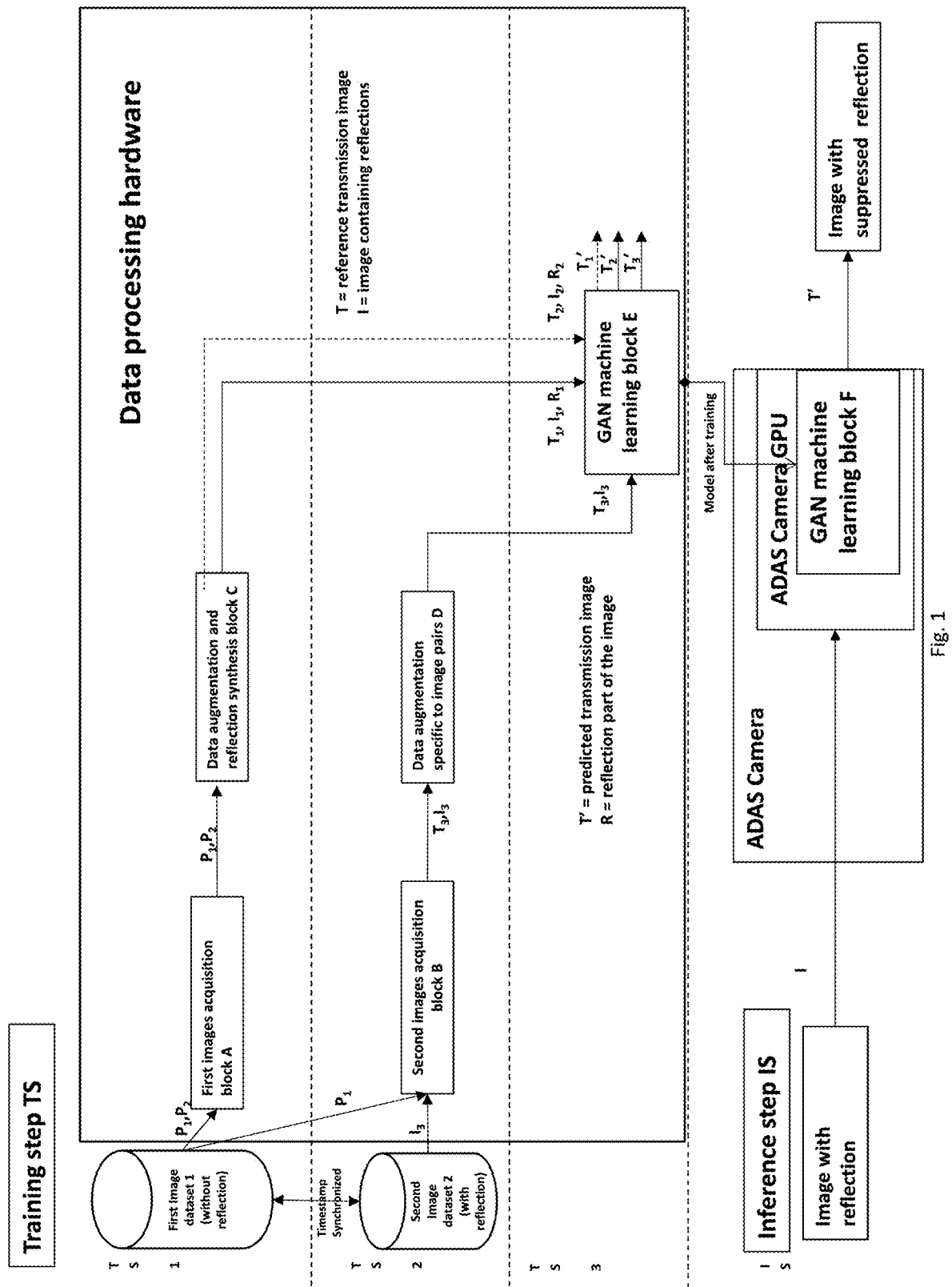
FIG. 1 illustrates a schematic representation of the method of the present disclosure and of the components of the data processing hardware.

The method of the present disclosure starts from the idea that the method for reflection removal using a single image should be based on artificial intelligence, "teaching" the ADAS camera of the vehicle how to remove the reflection based on two corresponding pluralities of images taken by two other ADAS cameras of the same type. In this way it is removed the need to have additional contextual information at the moment of the use of a single image for reflection removal.

The method has three steps: an acquisition step AS, a training step TS and an inference step IS.

The inference step corresponds to the day-to-day use of the method in the ADAS camera of a vehicle, the ADAS camera provided with a graphical processing unit (GPU).

For the purpose of adapting the removal of the reflection to the specific context when the single image is acquired by the ADAS camera of a vehicle, the inventors thought to use a GAN machine learning module F integrated in the GPU of the ADAS camera to train the GPU of the ADAS camera to carry out the removal reflection of the single image.

Thus, in the present disclosure, the GPU of the ADAS camera is adapted to integrate the machine learning module F such that to allow running in the inference step of a GAN machine learning model, hereafter for simplicity called "the machine learning model" on the machine learning module F. Hereafter, the reference to the training of the ADAS camera of the vehicle shall be read as reference to the training of the GPU of the ADAS camera.

The machine learning model is trained in the training step using the data acquired in the acquisition step.

In the acquisition step, two ADAS cameras are used: a first ADAS camera and a second ADAS camera. The two ADAS cameras have identical configurations between themselves and identical configuration with the ADAS camera used in the inference step, with one exception: the first ADAS camera is provided with a physical reflection removal filter, whereas the second ADAS camera is not provided with any reflection removal filter. Both ADAS cameras are provided with respective timestamps.

The first ADAS camera captures first ADAS camera images, whereas the second ADAS camera captures second ADAS camera images.

The two ADAS cameras are positioned on a training vehicle, the training vehicle having similar overall size with the vehicle of the inference step, the windows of the training vehicle having similar characteristics with the windows of the vehicle of the inference step, and the positioning of the two cameras being similar with the ones of the vehicle of the inference step. For example, if the ADAS camera of the inference step is to be used to capture images through the windscreen, the two ADAS cameras used in the acquisition step will be placed such that to capture images through the windscreen and not through the rear window.

The two ADAS cameras are positioned within the training vehicle aligned such that to have essentially the same field of view and such that the two cameras capture in their respective images essentially the same content—that is viewed from essentially the same perspective and at the same time. One example of positioning is stacking vertically one of the two ADAS cameras above the other one, being vertically aligned. Due to the small size of the ADAS cameras as compared with the content of the images, there is no substantial impact on the content of the fact that the cameras are placed one above the other.

The two ADAS cameras with the configuration described above capture images of the environment according to prior art. The first ADAS camera images have the reflection removed by means of the physical reflection removal filter, the second ADAS camera images have the natural reflection present.

Throughout the present disclosure, the images containing reflection are called "mixed images."

The captured images of the two ADAS cameras are sent to two respective image datasets stored in a non-volatile datasets memory.

The first ADAS camera images—namely the ones with the reflection removed—are sent to a first image dataset 1, having images Pi without reflection.

The second ADAS camera images—namely the ones with the natural reflection present—are sent to a second image dataset 2, having naturally mixed images I3$i$ having natural reflection.

The first image dataset 1 is synchronized with the second image dataset 2 by the timestamps of the two ADAS cameras.

For the sake of simplicity, FIG. 1 illustrates from the acquisition step only the first image dataset 1 and the second image dataset 2.

The two ADAS cameras used in the acquisition steps are used solely for providing respective images for the respective image datasets used in the training step for the training of the machine learning module. For this reason, it is not necessary that the two ADAS cameras used in the acquisition steps be provided with the machine learning module.

The training step is carried out by a data processing hardware including: a first images acquisition block A configured to receive images from the first image dataset 1, a second images acquisition block B configured to receive images from the second image dataset 2, a data augmentation and reflection synthesis block C, a data augmentation block D specific to image pairs, and a GAN machine learning block E.

With reference to FIG. 1, the training steps TS is detailed below with its sub-steps.

First Training Step TS1

The first images acquisition block A receives a randomly sampled pair of images P1 and P2 from the first image dataset 1. The first images acquisition block A is a buffer having the role to prepare the images received from the first image dataset 1 for the further processing detailed in the subsequent training sub-steps. The random sampling is according to prior art.

Both the first image P1 and the second image P2 are without reflection, because they were sampled from the first image dataset 1. The first image P1 is selected to be used as transmission layer, referred to in this present disclosure as a first transmission image T1, having the meaning of "reference" or, alternatively called "true" image.

The selection of the image used as "true" image is also random, that is, it can be any of P1 or P2. For the sake of ease of understanding, in this present disclosure it was used the first image P1.

Figure 2:
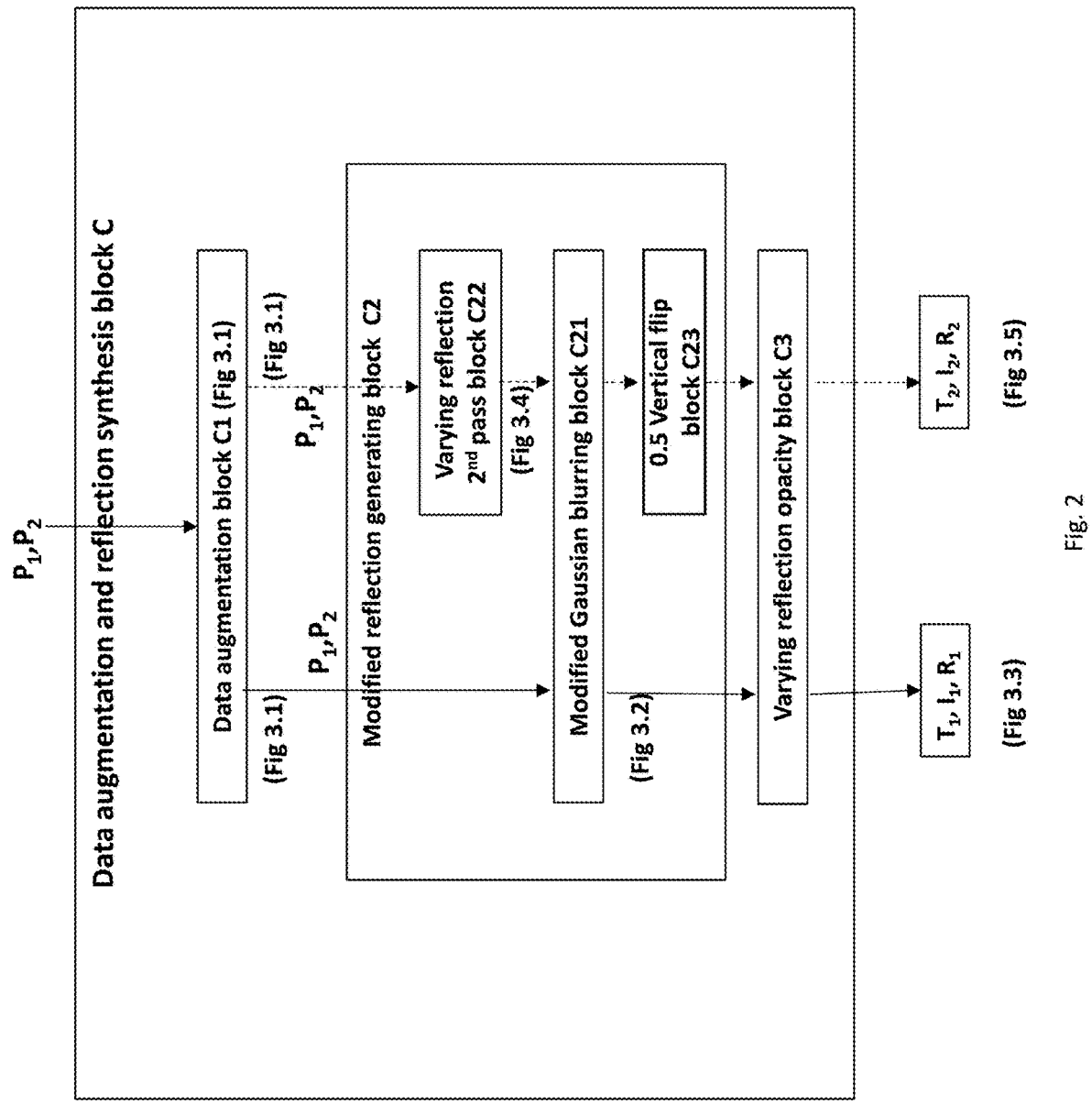
FIG. 2 illustrates a schematic detailed representation of the training step of the method and of the components of the data processing hardware involved in this step.

With reference to FIG. 2, the data augmentation and reflection synthesis block C includes three blocks: a data augmentation block C1, a modified reflection synthesis generating block C2, and a varying reflection opacity block C3.

The modified reflection synthesis generating block C2 includes three blocks: a modified Gaussian blurring block C21, a varying reflection $2^{nd}$ pass block C22, and a vertical flip block C23.

Generically, as prior art teaches, the pair of randomly sampled images P1 and P2 are used as input into some kind of reflection processing block, outputting a mixed image, where the mixed image is considered as a per channel pixel-wise sum of T and R and can be expressed as:

$$I=T+R$$

The expression "per channel" refers to the channels of color 1 channel in case of grayscale images, Red Blue Green (RBG) or Blue Green Red (BGR) in case of 3-channel images; or Red Green Green Blue (RGGB) in case of 4-channel images.

Thus, generically, after processing, P1 will become T and P2 will become R.

In the method of the present disclosure, based on each pair of randomly sampled images P1 and P2 used as input to the data augmentation and reflection synthesis block C, there are two mixed images instead of one: a first mixed image I1 and a second mixed image I2.

The data augmentation block C1 augments the first image P1 and the second image P2 using a pair of corresponding augmentation parameters: first augmentation parameters result from sampling firstly for the first image P1 and second augmentation parameters result from sampling secondly for the second image P2. Non-limiting examples of augmentation operations are resizing, cropping and horizontal flipping.

The sample resizing and cropping parameters are uniformly distributed in pre-set resizing and cropping intervals, in order to obtain a specific target size of the image. For example, the resizing is done so as to have an increase of the size with 0% to 20% than the expected shape of the image as the initial imagine is about two times bigger than the resolution used for training, whereas the cropping interval is between 0 and 20% inclusively depending on the dimensions of the images after resizing. Or, in other words, the resizing parameters may be uniformly sampled from the range [0, 0.2] increase of size, individually for the first image P1, respectively for the second image P2, and the cropping parameters may be uniformly sampled from the range [0, 0.2] crop of size individually for the resized first image P1, respectively for the second image P2.

After resizing and the cropping of the first image P1 and of the second image P2, the first data augmentation block C flips the resized and cropped images. For example, the flip can be a horizontal flip of 50% for both images. In other words, the horizontal flip parameter is uniformly sampled from the range [0,0.5] for both resized and cropped images P1, P2.

The resizing, the cropping and the flipping are carried out for the purpose of increasing the number of training examples while making use of the same images received from the first image dataset 1.

The augmentation operations applied to each of the first image P1 and the second image P2 are selected randomly, for example the flipping applied to the first image P1 can be of 180°, whereas there is no flipping for the second image P2.

An example of the resulting images after resizing, cropping and flipping is depicted in FIG. 3.1.

The first mixed image I1 is obtained by a first altering of the images P1 and P2, which become T1 and R1, respectively, and then overlapping the first synthetical reflection R1 by the modified Gaussian blurring block C21 over the first transmission image T1.

It was observed that, when first training only with synthetical data—that is only with the first mixed images I1, the results were poor, that is the reflection was poorly removed. By comparing the synthetical reflections with the reflections from the real world in the specific context of the images provided by the ADAS cameras, the observation was that there was a significative difference in luminosity and blurring level of the reflections. Namely, the reflections from the real world were only slightly blurred, whereas the synthetical reflections used initially in the training of the machine learning model generated quite blurred images.

For this reason, it was decided to modify the blurring block of the prior art (i.e., an image-blurring filter that uses a Gaussian function) by introducing two additional features: by using in the modified Gaussian blurring block C21 a kernel of 1 for the Gaussian blurring, while keeping the standard deviation close to 0, sampled uniformly from the interval [0.0001,0.001] in order to always obtain a reflection by slightly blurring the R1 image, and by increasing the intensity of the reflection by adding an opacity parameter in the varying reflection opacity block C3.

Thus, the modified Gaussian blurring block C21 is different from the blurring block of the prior art. Due to the above-captioned enhancements, the modified Gaussian blurring block C21 outputs a sharp R image as being the first synthetical reflection R1, together with the first mixed image I1 and a first transmission image T1. The first transmission image T1 is the one that corresponds to the first image P1 which is a real image, that is not generated synthetically, and the only difference is that the first transmission image T1 was obtained from augmenting P1 by resizing, cropping and horizontal flipping in half of the cases.

Thus, the first mixed image I1 is expressed as:

$$I1=T1+R1=T1+\text{Sharp } R$$

FIG. 3.2. illustrates the three images outputted by the modified Gaussian blurring block C21: I1, T1, Sharp R=R1.

It was decided to introduce the second mixed image I2 which is outputted at the end of processing through the three blocks, as it can be seen in FIG. 2: the varying reflection $2^{nd}$ pass block C22, the modified Gaussian blurring block C21 and the vertical flip block C23.

The first image P1 and the second image P2 undergo in the varying reflection $2^{nd}$ pass block C22 the same operations of altering and overlapping as the first mixed image I1 but applying the second augmentation parameters. For example, the second augmentation parameters can be: resizing, cropping, horizontal flipping. Then they undergo the adding of a second synthetical reflection R2 generated by the modified Gaussian blurring block C21.

In order to have a varying reflection between the first synthetical reflection R1 as sharp R and the second synthetical reflection R2 as low blurred R, the standard deviation of the Gaussian blurring convolution, in the case of the second synthetical reflection R2, was uniformly sampled from the range [0.0001, 0.25], while keeping the kernel size 1, as part of the modified Gaussian blurring block C21. The range of the standard deviation accommodates the need of some variance in the blurring while still maintaining a low blurring level of the reflections.

Then, the second image P2 as outputted by the modified Gaussian blurring block C21 undergoes a vertical flipping carried out by the vertical flip block C23, half of the times.

This means that the reflection is vertically flipped half of the times in such way to produce illuminated reflections in the bottom side of the frame, by considering the sky as the source of reflection. Here it was decided to flip vertically the reflection layer in half of the cases so as to have the sky, from the upper part of the image, as reflection for both the upper and lower part of the reflection layer. This choice can be explained by the fact that the reflection of the sky is generally bright and similar to other strong reflections.

Consequently, the vertical flip block C23 outputs a low blurred image R as being the second synthetical reflection R2, together with the second mixed image I2 and a second transmission image T2. The second transmission image T2 is the one that corresponds to the first image P2 which is a real image, that is not generated synthetically and only augmented by resizing, cropping and horizontal flipping in half of the cases.

Thus, the second mixed image I2 is expressed as follows:

$$I2=T2+R2=T2+Low \text{ blurred } R$$

FIG. 3.4. illustrates the three images outputted by the varying reflection $2^{nd}$ pass block C22:I2, T2, Low blurred R, where Low blurred R=R2.

As it can be seen in FIG. 3.1, FIG. 3.2 and FIG. 3.4, the first transmission image T1 and the second transmission image T2 are both generated from the first image P1, and the only difference between them is that they are generated using different randomly sampled parameters for the augmentation: the first augmentation parameters for the first transmission image T1 and the second augmentation parameters for the second transmission image T2. As such, it is possible that, for example one of them is resized to a bigger dimension or is horizontally flipped, while the other is not.

The first synthetical reflection R1 and the second synthetical reflection R2 are then processed by the varying reflection opacity block C3 by adding the opacity parameter, used to improve the realism of the reflection by creating stronger or weaker reflections. The reflection opacity parameter is uniformly sampled from the range [0.7, 0.85] individually for the first synthetical reflection R1, respectively the second synthetical reflection R2. The adding of the opacity parameter, when applied to first synthetical reflection R1 and the second synthetical reflection R2 ends up affecting the first mixed image I1 and correspondingly the second mixed image I2.

The explanation of the afore-mentioned sampling range is that it helps to have certain degree of varying opacity, while at the same time allowing good visibility of the shape and color of objects behind the reflection. In cases where the reflection is strong and occludes the perspective behind it, when removing the reflection, much of the content is also removed, thus the quality of the picture provide to the ADAS processing chain is poor.

Two sets of images are outputted by the data augmentation and reflection synthesis block C at the end of TS1: the first set of images containing I1, T1, R1=Sharp R, and the second set of images containing I2, T2, and R2=Low blurred R.

The difference between Sharp R and Low blurred R represents a slight variation of the reflection blurring parameter.

FIG. 3.3. illustrates the three images outputted by the modified Gaussian blurring block C21: I1, T1, R1=Sharp R after processing by the varying reflection opacity block C3 but without the processing by the varying reflection $2^{nd}$ pass block C22 and the vertical flip block C23, whereas FIG. 3.5 illustrates the three images outputted by the varying Gaussian blurring block C21: I2, T2, R2=Low blurred R after processing by the varying reflection opacity block C3, with the processing by the varying reflection $2^{nd}$ pass block C22 and the vertical flip block C23. The main differences between the two sets of I, T and R are that R1 is a sharper reflection and the second synthetical reflection R2 can be vertically flipped half of the time. As a consequence, the second mixed image I2 and the first mixed image I1 differ in the sharpness and, possibly, in the vertical rotation of their corresponding reflections, while at the same time the augmentations of the first transmission image T1, the first synthetical reflection R1, the second transmission image T2, and the second synthetical reflection R2, are different because of the sampling with randomly chosen different values from the same distributions mentioned before.

For the sake of easing the understanding, the references to the components of the first mixed image I1 and of the second mixed image I2 throughout the processing carried out by each of the components of the data augmentation and reflection synthesis block C are maintained the same, as the person skilled in the art understands that each of the images is subject to processing in each of the blocks of the data augmentation and reflection synthesis block C.

In the literature there is a method presented in document [17], where the mixed image is reintroduced multiple times in the neural network as to iteratively remove the reflection.

The advantage of generating simultaneously two mixed images I1 and I2 having a slightly altered version of the synthetical reflection—as the invention teaches in this step instead of reintroducing the same mixed images multiple times, is that it provides the machine learning model with more diversified data obtained based on the same number of captured images, while altering the generated reflection. Reintroducing the mixed images multiple times leads to overfitting the same type of reflection by processing it twice or more times.

At the end of the first training step, the first transmission image T1, the first synthetical reflection R1, the first mixed image I1, the second transmission image T2, the second synthetical reflection R2 and the second mixed image I2 are sent to a GAN machine learning block E.

Second Training Step TS2

The second images acquisition block B receives the first image P1 from the first image dataset 1 and a third mixed image I3 from the second image dataset 2.

The second images acquisition block B, like the first images acquisition block A is a buffer, with the role to prepare the images received from the first image dataset 1 and from the second image dataset 2 for the further processing detailed in the subsequent training sub-steps.

The first image P1 from the first image dataset 1 has the same content with the third mixed image I3 from the second image dataset 2. It is required a geometrical alignment of the first image P1 and the third mixed image I3, preferably vertical, which corresponds to the vertical alignment of the first ADAS camera and of the second ADAS camera. The vertical alignment is preferred to the horizontal alignment because it is better adapted to solve the problem of the present disclosure for the following reasons: due to the small size of the ADAS cameras as compared with the content of the images, there is no substantial impact on the content of the fact that the cameras are placed one above the other; the small difference between the first image P1 and the third mixed image I3 refer to the upper and the lower margin of the pictures. The upper margin of all ADAS camera pictures depict the sky whereas the lower margin of all ADAS camera pictures usually depict the hood of the vehicle. Both the sky and the hood are of less interest for the ADAS processing chain which is the beneficiary of the pictures. The small difference between the respective images from the first image dataset 1 and from the second image dataset 2 can be further reduced following the augmentation carried out by the data augmentation block C1, respectively by the data augmentation block D specific to image pairs. Specificity of data augmentation block D consists in performing data augmentation dedicated to pairs of images, namely the pair of images P1 and the third mixed image I3 enter the data augmentation block D, where they will be processed.

The third mixed image I3—that is the one with the natural reflection—will be used in the next step to infer a corresponding image without reflection.

The data augmentation block D specific to image pairs is identical to the data augmentation block C1, with the only difference being that the augmentation parameters are sampled only once for the pairs I3 and P1, and, as such, they are identically augmented. Thus, the processing of the pair of images P1 and the third mixed image I3 is similar with the processing of the pair of images P1 and P2 by the data augmentation block C1, that is augmenting the image P1, transforming it into a third transmission image T3 and the third mixed image I3 using third augmentation parameters. In this sub-step, neither synthetic generation, nor opacity, nor vertical flipping is applied.

For the sake of easing the understanding, the references to the components of the third mixed image I3 and of the third transmission image T3 throughout the processing carried out by the data augmentation block D specific to image pairs are maintained the same, as the person skilled in the art understands that each of the images is subject to processing in the data augmentation block D specific to image pairs.

As seen in FIG. 1, the output of this stage is the pair of images consisting in the third transmission image T3 and the third mixed image I3, which is sent to the GAN machine learning block E.

Third Training Step TS3

The third training step is carried out by the GAN machine learning block E, based on the machine learning model running on the data processing hardware.

The input, as shown in FIG. 1, comes from the data augmentation and reflection synthesis block C and from the data augmentation block D specific to image pairs.

In essence, in this stage, at each iteration, the machine learning model learns to suppress the reflection from each of the three mixed images, I1, I2, I3.

The machine learning model uses the GAN which basically includes a Generator, a Discriminator and a plurality of parameters.

In the training stage, at each iteration, the Generator is provided with the images containing reflection, that is with the three mixed images, I1, I2, I3. The Generator generates corresponding predicted transmission images T': a first predicted transmission image T'1 corresponding to the first transmission image T1, a second predicted transmission image T'2 corresponding to the second transmission image T2, and a third predicted transmission image T'3 corresponding to the third transmission image T3.

The predicted transmission images T'1 ... T'n, considered after a preset number of iterations, approximate the corresponding transmission images T1 ... Tn, the corresponding transmission images T1 ... Tn being based on real images and not on synthetical images. The corresponding transmission images T1 ... Tn have the value of reference images. The predicted transmission images T'1 ... T'n have the reflection suppressed. A full removal of the reflection is an aim of all removal methods; however, it is very difficult to obtain.

Then, the Discriminator is provided in the current iteration with three pairs of images: the first, second and third predicted transmission images T'1 ... T'3 and the corresponding first, second and third transmission images T1 ... T3, the latter having the value of reference images. The Discriminator is not aware which one of the two images of each pair is the reference image, and which one is the generated image. As such, for each image of the pair, the Discriminator calculates a certainty score that corresponds to the realism of the image.

Thus, at each iteration, the score is computed for each of the three predicted transmission images T'1 ... T'3 and for each of the three corresponding transmission images T1 ... T3.

This score is compared with a reference score, as the data processing hardware knows which one of the images is the reference image and which is not and then, the error of the Discriminator is quantified for each of the three predicted transmission images T'1 ... T'3 and for each of the corresponding three transmission images T1 ... T3 and an adversarial loss is calculated.

After calculating the adversarial loss, at each iteration, a pixel level loss is calculated between the first predicted transmission image T'1 and the first transmission image T1 as well as between the second predicted transmission image T'2 and the second transmission image T2.

The reason for not calculating the pixel level loss for the third predicted transmission image T'3 and its corresponding third transmission image T3 pair of images is the two images of the pair are obtained from two different cameras, preferably stacked vertically as it was disclosed previously, the third predicted transmission image T'3 being obtained from the third mixed image I3 after being processed by the Generator. As such, there is a slight shift between the resulting pairs of images which makes impossible a pixel level comparison. While for T'1-T2 and T'2-T2 pairs the pixel level comparison is possible as they all are obtained from the same camera.

Then, an alignment invariant loss and a feature level loss are added by the GAN machine learning block E, the calculation of the two losses being outside the scope of the present disclosure.

Then, based on the calculated losses, a backward pass adapted to the neural network is needed to correct the errors. The calculation of the differences and the backwards pass is outside the scope of the present disclosure.

The result is the optimization of the machine learning model by adjusting, after the preset number of iterations, the plurality of parameters of the machine learning model including adjusting the plurality of parameters, such that to optimize the generation of predicted transmission images T' as close as possible to the respective transmission images T according to the result of the calculated losses and the backward pass the preset number of iterations.

In an embodiment, the preset number of iterations for the adjusting of the machine learning model is 1, that is the adjusting of the plurality of parameters is carried out after each iteration. This has the advantage of better adjusting the process of learning.

This is the end of one iteration of the training step TS. A plurality of iterations is carried out during the training step TS in a similar way with the iteration described above.

Thus, in each iteration, the machine learning model generates an approximation of the image without reflection for each image with reflection.

The machine learning model is trained to generalize in order to suppress the reflection from the images containing reflection. This generalization expects the model to be invariant to the type of reflection that it "sees." As such, during training the machine learning model "sees" reflections that vary in sharpness and opacity while, at the same time, being generated from diverse images so as to have diverse resulting reflections. The expected generalization aims to an optimal removal of future reflections, during the inference step, reflections that were not present in the training data, while at the same time not altering the non-reflection part of images.

The simultaneous generation in TS1 of two mixed images—the first mixed image I1 and the second mixed image I2, having a slightly altered version of the synthetical reflection as well as increased intensity of the reflection by adding the opacity parameter have the advantage of feeding the machine learning model with a more diversified type of images. The images are closer to the reality of the images acquired by the ADAS cameras as compared with the machine learning models of prior art. For this reason, the expected generalization of what is and what is not a reflection in the images acquired by the ADAS camera yields better results for the particular case of ADAS cameras used in the vehicles, without getting stuck on the blurring level of each element of each image or being unable to see the same combination of the first image P1 and the second image P2 as they were sampled from the first image dataset 1.

The machine learning model is then optimized in order to run on the graphical processing unit GPU of the ADAS camera and then it is sent to a GAN machine learning block F of the GPU of the ADAS camera. The optimization of the machine learning model as well as the details of sending it to the GAN machine learning block F of the GPU are outside the scope of this present disclosure.

Inference Step IS

With reference to FIG. 1, in the inference step, the ADAS camera acquires images I from the real-life context, that are the equivalent of the mixed images of the training step because they do contain reflection.

The images I are processed by the GAN machine learning block F, that is already trained to suppress the reflection. Consequently, in the inference step, the GAN machine learning block F will output a predicted transmission image T', having the reflection suppressed.

An example of the images of the inference step is depicted in FIG. 3.6.

At the end of the inference step IS, the predicted transmission image T' is made available to the ADAS processing chain.

In an embodiment, the GAN is Single Image Reflection Removal Exploiting Misaligned Training Data and Network Enhancements, ERRNet.

The Generator and the Discriminator of the ERRNet used in the present disclosure are similar to the one disclosed in paper [14].

The Discriminator has ten 2D Convolutions for the base processing. Each layer has kernel 3, padding 1 and stride 1 or 2, changed intermediately, starting at 1 for the first convolution. After each of these convolutions, there is an activation function Leaky RELU with the alpha coefficient equal to 0.02. At the feature fields level there is, for each convolution, in this order, the following [input, output] dimensions: [3, 64], [64, 64], [64, 128], [128, 128], [128, 256], [256, 256], [256, 512], [512, 512], [512, 512], [512, 512]. In this embodiment, it is started with a 3-channel image (color) of input shape 224×224×3, which, after the first convolution transforms the image from 224×224×3 into 112×112×64.

After the ten convolutions, there is an Adaptive Average Pooling 2D layer that reduces each feature field of the 512 to the dimension 1×1, which results in 1×1×512. After this, two Convolutional 2D layers are included, with kernel size 1 and stride 1, in between being a Leaky RELU with alpha 0.02. These convolutions change the feature fields as follows [512, 1024], and then [1024, 1], so as to end up extracting only the relevant information that is put on 1 channel. Over this channel a Sigmoid layer is applied in order to determine the final prediction in the interval [0.0, 1.0]. This represents how realistic the Discriminator finds the given image. This Discriminator is used only for training, and at each iteration it is applied on both the predicted transmission images T'1 . . . T'n generated by the Generator, as well as on the images without reflection, that is the transmission images T1 . . . Tn, so as to better learn what a real image looks like.

For the Generator, there are quite a few more layers in its implementation but three structures should be noted as being the most relevant. The Generator takes as input each of the given images, that is the transmission images T1 . . . Tn, with not only its original channels, but additionally some ~1000 channels concatenated to it after the image is processed by a VGG-19 which is frozen after training on ImageNet, where ImageNet is a reference dataset for images when training 2D object detection and VGG-19 is a general architecture used as backbone for feature extraction. The channels represent the hyper-column features of the activation of specific layers of the VGG-19. Both ImageNet and VGG-19 are described in detail in document No. [18].

The Generator initially contains three convolutional layers, each followed by a RELU activation. This is followed by thirteen residual blocks, then another convolutional layer with RELU, and then a Pyramid Pooling block followed by a last Convolutional layer.

Important notice should be given to the thirteen residual blocks and the Pyramid Pooling block. The residual structures have the role of processing the image at different depths by increasing the number of feature fields resulting from multiple Convolutional layers. Residual blocks are known in the literature for using the information from previous layers so as to combine different layers of abstraction.

The convolutional layer that follows the thirteen residual blocks has the role of trying to compress the information by reducing the dimensionality of the data. This in turn is given to the Pyramid Pooling block. Here, the feature fields are processed at four different resolutions so as to remove the reflection at different scales. The results of each scale are resized to the initial resolution that was given to the block, and all the feature fields are concatenated together. Afterwards, the last convolutional layer has the role of combining all of this information into one single image of the initial resolution—in this case of 224×224×3, which is supposed to have the reflection optimally removed. The resulting image is the predicted transmission image T'1 . . . T'n, which is then sent to the Discriminator for evaluation.

Although the architecture of the Generator and the Discriminator of the ERRNet used in the present disclosure is similar to the one disclosed in paper [14], the machine training model of the present disclosure is significantly improved in respect to the one disclosed in said paper [14], because the input data of the machine training model of the present disclosure is significantly different from the input data of the prior art for the reasons disclosed in detail above, namely the simultaneous generation in TS1 of two mixed images—the first mixed image I1 and the second mixed image I2, having a slightly altered version of the synthetical reflection as well as varying the intensity of the reflection by adding the opacity parameter.

In this embodiment using the ERRNet, the adjustment of the plurality of parameters is carried out after each iteration. This has the advantage that noise might be introduced alongside learning how to remove the reflection of each image. The noise originates from adjusting the plurality of parameters depending only on the error of the reflection removal on one image and not over multiple images.

The training method has the advantage that, when compared with the training method of prior art, generalizes better what is and what is not a reflection in the images acquired by the ADAS camera yielding better results than the training methods of prior art for the particular case of ADAS cameras used in the vehicles, while at the same time not altering the non-reflection part of images.

The trained machine learning model of the present disclosure has the advantage that is significantly improved in respect to prior art because the input data of the machine training model of the present disclosure is improved in respect to the input data of the prior art for the reasons disclosed in detail above, namely the simultaneous generation in TS1 of two mixed images—the first mixed image I1 and the second mixed image I2, having a slightly altered version of the synthetical reflection as well as increased intensity of the reflection by adding the opacity parameter.

In a second aspect of the present disclosure, it is presented a data processing hardware configured to carry out the training steps of the method in any of its preferred embodiments, including: a first images acquisition block, a second images acquisition block, a data augmentation and reflection synthesis block, a data augmentation block specific to image pairs, and a GAN machine learning block.

In an embodiment, the data augmentation and reflection synthesis block includes a data augmentation block, and a modified reflection synthesis generating block.

The data processing hardware includes at least one computer processing unit core at least one volatile memory RAM and at least one non-volatile memory ROM, the respective configuration of which is according to prior art.

Non-limiting examples of data processing hardware are: servers, laptops, computers or controllers, electronic control units.

In an embodiment, all blocks of the data processing hardware are comprised in a single hardware entity, as this has the advantage of reducing latency when it comes to the continuous fetching of the training data at each iteration of the training process.

In another embodiment, the blocks of the data processing hardware are included in separated individual hardware entities communicating between themselves by communication protocols. This embodiment is used in the cases when it is not possible to include all blocks of the data processing hardware in the same single hardware entity.

In an embodiment, the non-volatile datasets memory is part of the data processing hardware, whereas, in another embodiment, the non-volatile datasets memory is part of another processing hardware, communicating with the data processing hardware by communication protocols. Including the non-volatile datasets memory in the data processing hardware is more advantageous than placing it in the other processing hardware because it reduces latency when it comes to the continuous fetching of the training data at each iteration of the training process.

In a third aspect of the present disclosure, it is presented an ADAS camera of a vehicle, provided with the machine learning model of the present disclosure, trained in accordance with the training steps of the method in any of its embodiments and configured to carry out the inference step of the method in any of its embodiments.

The ADAS camera of the present disclosure has the advantage that provides better quality images after the removal of the reflection by applying the method of the present disclosure and as a result of the training of the machine learning model according to the training steps of the present disclosure.

In a fourth aspect of the present disclosure, it is presented a first computer program comprising instructions which, when executed by the data processing hardware of the present disclosure, causes the respective data processing hardware to perform the training steps of the method in any of its embodiments.

In a fifth aspect of the present disclosure, it is presented a second computer program comprising instructions which when executed by the ADAS camera of the present disclosure, causes the respective ADAS camera to perform the inference step IS of the method in any of its embodiments.

In a sixth aspect of the present disclosure, it is presented a first computer readable medium having stored thereon instructions of the first computer program of the present disclosure.

Finally, in a seventh aspect of the present disclosure, it is presented a second computer readable medium having stored thereon instructions of the second computer program of the present disclosure.

While certain embodiments of the present invention have been described in detail, those familiar with the art to which this invention relates will recognize various alternative designs and embodiments for practicing the invention as defined by the following claims.

LIST OF BIBLIOGRAPHICAL REFERENCES

[1] YOU L I and Michael S. Brown, Exploiting Reflection Change for Automatic Reflection Removal, 2013 IEEE International Conference on Computer Vision, 1-8 Dec. 2013, https://ieeexplore.ieee.org/document/6751413, available online as of 3 Mar. 2014

[2] Qiang Wen et al, Single Image Reflection Removal Beyond Linearity, Proceedings of the IEEE/CVF Conference on Computer Vision and Pattern Recognition (CVPR), 15-20 Jun. 2019, https://openaccess.thecvf.com/content_CVPR_2019/html/Wen_Singl e_Image_Reflection_Removal_Beyond_Linearity_CVPR_2019_paper.ht ml, available online as of 9 Jan. 2020

[3] YiChang Shih et al, Reflection removal using ghosting cues, 2015 IEEE Conference on Computer Vision and Pattern Recognition (CVPR), 7-12 Jun. 2015, https://ieeexplore.ieee.org/document/7298939, available online as of 15 Oct. 2015

[4] Tianfan Xue et al, A Computational Approach for Obstruction-Free Photography, ACM Transactions on Graphics (Proc. SIGGRAPH), 2015, https://people.csail.mit.edu/mrub/papers/ObstructionFreePhotog raphy_SIGGRAPH2015.pdf

[5] Renjie Wan et al, Depth of field guided reflection removal, 2016 IEEE International Conference on Image Processing (ICIP), 25-28 Sep. 2016, https://ieeexplore.ieee.org/document/7532311

[6] Nikolaos Arvanitopoulos, Radhakrishna Achanta and Sabine Sosstrunk, Single Image Reflection Suppression, 2017 IEEE Conference on Computer Vision and Pattern Recognition (CVPR), 21-26 Jul. 2017, https://ieeexplore.ieee.org/document/8099673, available online as of 9 Nov. 2017

[7] Donghoon Lee, Ming-Hsuan Yang and Songhwai Oh, Generative Single Image Reflection Separation, arXiv:1801.04102v1 [cs.CV], 12 Jan. 2018, https://arxiv.org/pdf/1801.04102.pdf

[8] Huaidong Zang et al, Fast User-Guided Single Image Reflection Removal via Edge-Aware Cascaded Networks, IEEE Transactions on Multimedia (Volume: 22, Issue: 8, Aug. 2020), pages 2012-2023, 4 Nov. 2019, https://ieeexplore.ieee.org/document/8890835

[9] Yu Li et al, Single Image Layer Separation using Relative Smoothness, 2014 IEEE Conference on Computer Vision and Pattern Recognition, 23-28 Jun. 2014, https://openaccess.thecvf.com/content_cvpr_2014/papers/Li_Sing le_Image_Layer_2014_CVPR_paper.pdf, available online as of 25 Sep. 2014

[10] Daiqian Ma et al, Learning to Jointly Generate and Separate Reflections, 2019 IEEE/CVF International Conference on Computer Vision (ICCV), 27 Oct. 2 Nov. 2019, https://openaccess.thecvf.com/content_ICCV_2019/papers/Ma_Lear ning_to_Jointly_Generate_and_Separate Reflections ICCV 2019_pa per.pdf, available online as of 27 Feb. 2020

[11] Meiguang Jin; Sabine SOsstrunk and Paolo Favaro, Learning to see through reflections, 2018 IEEE International Conference on Computational Photography (ICCP), 4-6 May 2018, https://ieeexplore.ieee.org/document/8368464, available online as of 31 May 2018

[12] Ryo Abiko and Masaaki Ikehara, Single Image Reflection Removal Based on GAN With Gradient Constraint, IEEE Access (Volume: 7), pages 148790-148799, Oct. 14, 2019, https://ieeexplore.ieee.org/document/8868089

[13] Chao Li et al, Single Image Reflection Removal through Cascaded Refinement, arXiv:1911.06634v2 [cs.CV], 5 Apr. 2020 https://arxiv.org/abs/1911.06634

[14] Kaixuan Wei et al, Single Image Reflection Removal Exploiting Misaligned Training Data and Network Enhancements, arXiv:1904.00637v1 [cs.CV], 1 Apr. 2019, https://arxiv.org/pdf/1904.00637.pdf

[15] Xuaner Zhang et al, Single Image Reflection Separation with Perceptual Losses, arXiv:1806.05376v1 [cs.CV], 14 Jun. 2018, https://arxiv.org/abs/1806.05376

[16] Qingnan Fan et al, A Generic Deep Architecture for Single Image Reflection Removal and Image Smoothing, arXiv:1708.03474v2 [cs.CV]10 Jun. 2018, https://arxiv.org/abs/1708.03474

[17] Jie Yang et al, Seeing Deeply and Bidirectionally: A Deep Learning Approach for Single Image Reflection Removal, Proceedings of the European Conference on Computer Vision (ECCV), 2018, pp. 654-669, https://link.springer.com/conference/eccv

[18] Olga Russakovsky et al, ImageNet Large Scale Visual Recognition Challenge arXiv:1409.0575v3, 30 Jan. 2015, https://arxiv.org/pdf/1409.0575.pdf

REFERENCE SIGNS

Data processing hardware
A—first images acquisition block
B—second images acquisition block
C data augmentation and reflection synthesis block
C1—data augmentation block
C2—modified reflection synthesis generating block
C21—modified Gaussian blurring block
C22—varying reflection $2^{nd}$ pass block
C23 vertical flip block
C3—varying reflection opacity block
D—data augmentation block specific to image pairs
E—Generative Adversarial Network machine learning block,
F Generative Adversarial Network GAN machine learning module of the ADAS camera
TS Training Step
I1 first mixed image
R1 first synthetical reflection
T1 first transmission image
I2 second mixed image
R2 second synthetical reflection
T2 second transmission image
I3 third mixed image having natural reflection
T3 third transmission image
T'1 predicted transmission image corresponding to the first mixed image I1,
T'2 predicted transmission image corresponding to the second mixed image I2,
T'3 predicted transmission image corresponding to the third mixed image I3,
IS Inference Step
I image from real-life (mixed image)
T' predicted transmission image

The invention claimed is:

1. Method of reflection removal based on a Generative Adversarial Network (GAN) used for training of an ADAS camera of a vehicle, wherein the method comprises:
performing an acquisition operation comprising
a1) capturing simultaneously first ADAS camera images by a first ADAS camera and second ADAS camera images from a second ADAS camera, wherein the first ADAS camera identical with the second ADAS camera and identical with the ADAS camera of the vehicle, and the first ADAS camera further comprises a physical reflection removal filter, the first ADAS camera and the second ADAS camera aligned such that to have essentially the same field of view, the first ADAS camera and the second ADAS camera capturing in their respective images essentially the same content at the same time, and
a2) sending the captured images to two respective image datasets, including sending the first ADAS camera images to a first image dataset of the image datasets, the first image dataset comprising images without reflection,
and sending the second ADAS camera images to a second image dataset of the image datasets, the second image dataset comprising naturally mixed images having natural reflection;
performing a first training operation comprising
b1.1) receiving, by data processing hardware, a randomly sampled pair of images and from the first image dataset by a first images acquisition block,
b1.2) carrying out, by the data processing hardware, a first altering of the randomly sampled pair of images by a data augmentation and reflection synthesis block, generating a first transmission image, a first synthetical reflection, and a first mixed image generated by overlapping the first synthetical reflection over the first transmission image and, simultaneously, carrying out a second altering of the images by the data augmentation and reflection synthesis block, generating a second transmission image, a second synthetical reflection, and a second mixed image generated by overlapping the second synthetical reflection over the second transmission image, and
b1.3) sending the first transmission image, the first synthetical reflection, the first mixed image, the second transmission image, the second synthetical reflection and the second mixed image to a GAN machine learning block, wherein the first transmission image, the first reflection, and the first mixed image are generated by augmenting the first image and the second image by a data augmentation block using first augmentation parameters, adding the first synthetical reflection by a modified Gaussian blurring block, and adding an opacity parameter to the first synthetical reflection by a varying reflection opacity block, and wherein the second transmission image, the second synthetical reflection and the second mixed image are generated by augmenting the first image and the second image by a varying reflection second pass block using second augmentation parameters, adding the second synthetical reflection generated by the modified Gaussian blurring block, vertical flipping of the second image by a vertical flip block, and adding the opacity parameter to the second synthetical reflection by the varying reflection opacity block;
performing a second training operation comprising
b2.1) receiving by a second images acquisition block: the first image from the first image dataset and a third mixed image from the second image dataset having the same content with the first image,
b2.2) carrying out, by a data augmentation block specific to image pairs, augmentation of the first image generating a third transmission image, and augmentation of the third mixed image using third augmentation parameters, and b2.3) sending the third transmission image and the third mixed image to the GAN machine learning block;

performing a third training operation carried out by the GAN machine learning block, comprising b3.1) generating at each iteration, based on a machine learning model comprising a plurality of parameters, corresponding predicted transmission images by a generator of the GAN machine learning block a first predicted transmission image corresponding to the first transmission image, a second predicted transmission image corresponding to the second transmission image, and a third predicted transmission image corresponding to the third transmission image, b3.2) calculating, at each iteration, by a Discriminator of the GAN machine learning block a certainty score for each pair of images the first predicted transmission image and the first transmission image, the second predicted transmission image and the second transmission image, and the third predicted transmission image and the third transmission image, b3.3) calculating, at each iteration, an adversarial loss based on the certainty score, a pixel level loss for the pairs of the first predicted transmission image and its corresponding first transmission image, the second predicted transmission image and its corresponding second transmission image, a feature level loss and an alignment invariant loss for all three pairs of images, b3.4) optimizing, after a preset number of iterations, the machine learning model, including adjusting the plurality of parameters, such that to optimize the generation of predicted transmission images as close as possible to the respective transmission images, b3.5) compressing the optimized machine learning model and sending the compressed machine learning model to a GAN machine learning block of the ADAS camera; and performing an inference operation carried out by the ADAS camera of the vehicle, comprising c1) acquiring, by the ADAS camera, an image, the image containing reflection, c2) suppressing, by the GAN machine learning block, of the reflection and generating a predicted transmission image, having the reflection suppressed, and c3) making the predicted transmission image available to an ADAS processing chain.

2. The method of claim 1, wherein the GAN is Single Image Reflection Removal Exploiting Misaligned Training Data and Network Enhancements (ERRNet).

3. A data processing hardware comprising: a first images acquisition block, a second images acquisition block, a data augmentation and reflection synthesis block, a data augmentation block specific to image pairs, and a GAN machine learning block, wherein the data processing hardware is configured to carry out the training operation of claim 1.

4. The data processing hardware according to claim 3, wherein the data augmentation and reflection synthesis block comprises: a data augmentation block, a modified reflection synthesis generating block, and a varying reflection opacity block.

5. The data processing hardware according to claim 4, wherein the modified reflection synthesis generating block comprises: a modified Gaussian blurring block, a varying reflection $2^{nd}$ pass block and a vertical flip block.

6. An ADAS camera of a vehicle, wherein the ADAS camera is provided with the machine learning model trained in accordance with the training operation and configured to carry out the inference step of claim 1.

7. A first computer program comprising instructions which, when executed by the data processing hardware of claim 3, causes the respective data processing hardware to perform the training operations.

8. A second computer program comprising instructions which when executed by the ADAS camera of claim 6, causes the respective ADAS camera to perform the inference operation.

9. A first computer readable medium having stored thereon instructions of the first computer program of claim 7.

10. A second computer readable medium having stored thereon instructions of the second computer program of claim 8.

* * * * *